Dec. 14, 1954     A. H. SQUIRES ET AL     2,696,926
HYDRAULIC HAYFORK
Filed Aug. 17, 1953     2 Sheets-Sheet 1
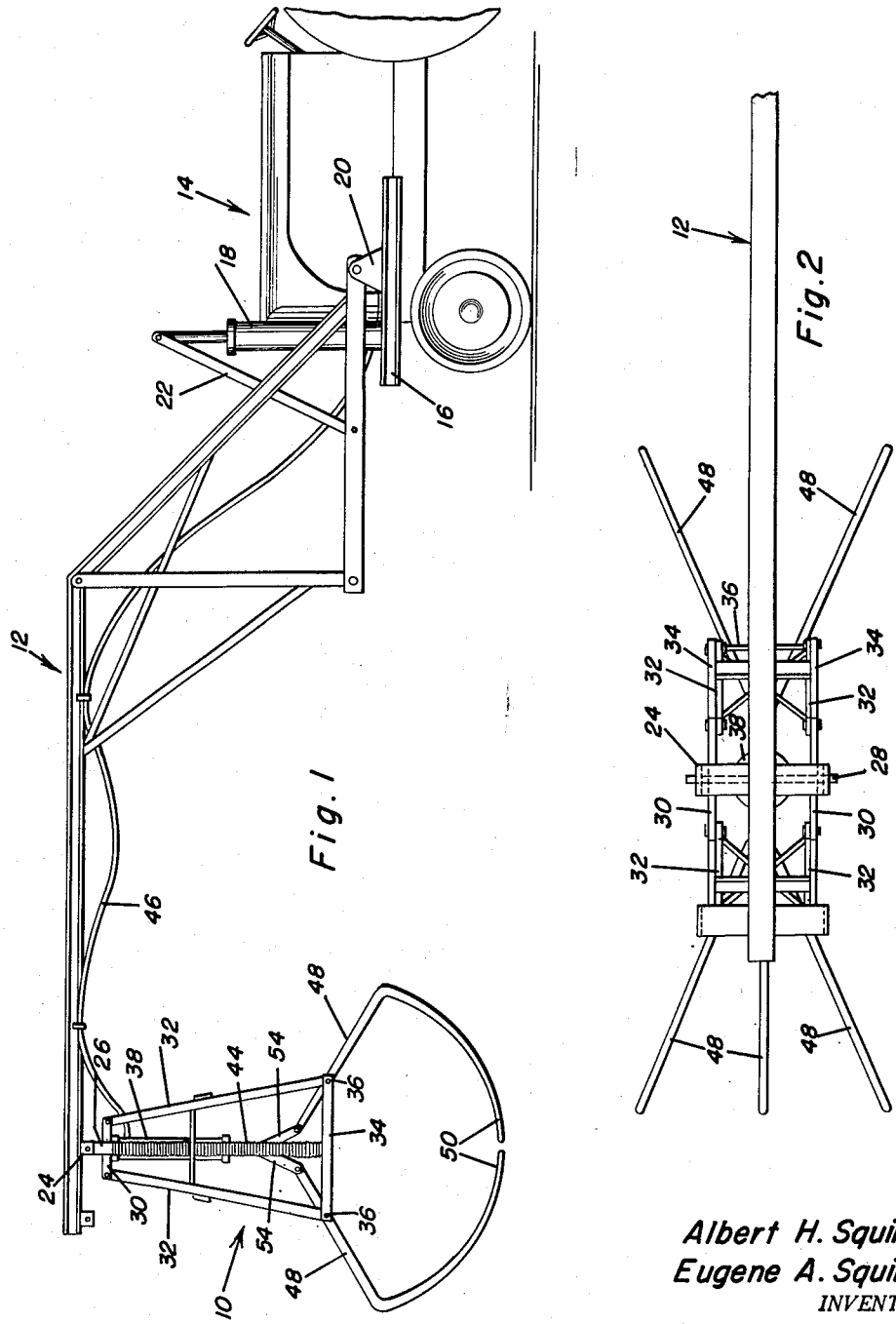
Albert H. Squires
Eugene A. Squires
INVENTORS
BY *[signatures]*
Attorneys Dec. 14, 1954     A. H. SQUIRES ET AL     2,696,926
HYDRAULIC HAYFORK Filed Aug. 17, 1953     2 Sheets-Sheet 2

Albert H. Squires
Eugene A. Squires
INVENTORS

2,696,926

HYDRAULIC HAYFORK

Albert H. Squires and Eugene A. Squires, Bucklin, Kans.

Application August 17, 1953, Serial No. 374,572

2 Claims. (Cl. 214—147)

This invention relates to a hay fork and more particularly to a hay fork having improved means for actuating the tines of the hay fork.

An object of this invention is to provide an improved hay fork having hydraulic means for moving the tines in one direction and spring means for moving the tines in the other direction.

Another object of the invention is to provide an improved hay fork wherein the tine actuating means does not interfere with the material carried in the tines.

A further object of the invention is to provide a hay fork wherein the material to be transported comes in contact with the actuating means to aid in closing the tines about the material.

A still further object of the invention is to provide a hay fork which is sturdy and durable in construction, efficient in operation and relatively simple and inexpensive to manufacture, utilize and assemble.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the preferred form of the present invention mounted on a boom pivotally mounted to a tractor;

Figure 2 is a top view of the preferred form of the present invention;

Figure 3:
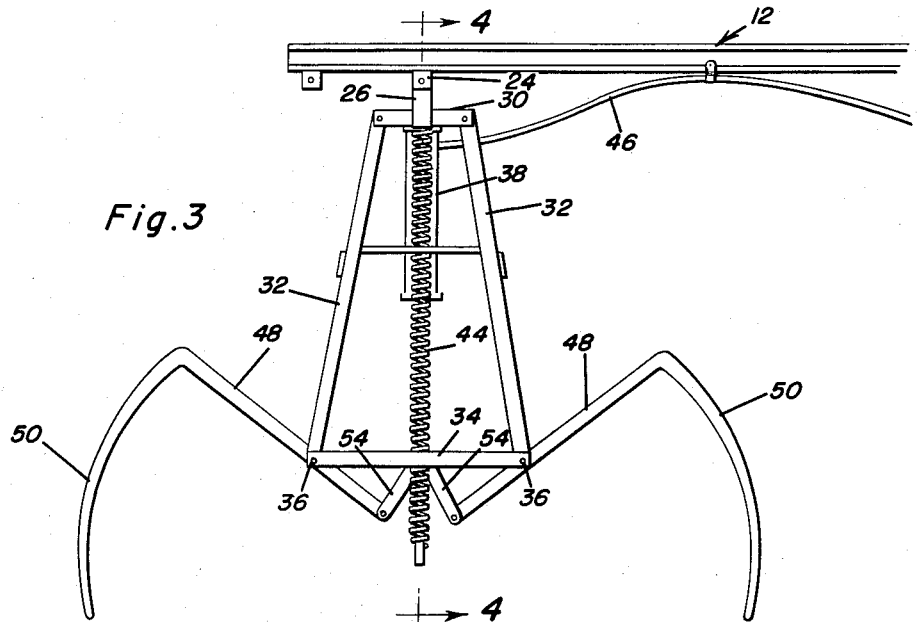
Figure 3 is a side elevational view of the hay fork comprising the present invention, showing the tines in their open position; and, Figure 4 is a sectional view of the preferred form of the present invention taken substantially along the section line 4—4 of Figure 3.
Figure 4:
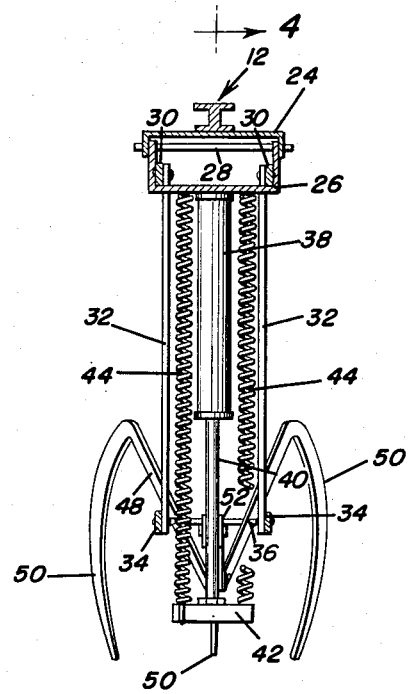

Referring now more specifically to the accompanying drawings, it will be seen that the improved hay fork forming the subject of this invention includes, as shown in Figure 1, a hydraulic hay fork 10 mounted on a boom 12 which is pivotally secured to a tractor 14.

The tractor 14 has a brace member 16 secured to the front end thereof, which brace 16 has a vertically extending hydraulic cylinder 18 mounted thereon. The boom 12 is pivotally secured to a bracket 20 mounted on the brace 16. A link 22 is connected between the boom and the end of a piston rod extending from the cylinder whereby movement of the piston rod will cause movement of the boom in a vertical direction. The boom 12 is provided with a horizontally extending member to which the hay fork 10 is secured.

The outer end of the boom 12 is provided with a downwardly extending U-shaped bracket 24. The hay fork 10 comprises a frame supported by a bracket 26 having a pair of upwardly extending legs at each end thereof, which legs are adapted to fit between the downwardly extending portions on the bracket 24. The brackets 24 and 26 are provided with axially aligned apertures through the legs thereof and a shaft 28 extends through the apertures, thereby forming a pivotal mounting for the hay fork on the boom.

The frame for the hay fork comprises a pair of parallel longitudinally extending members 30 secured to the bracket 26 adjacent the midpoints of the members 30. A downwardly extending member 32 is provided at each end of the members 30. The lower ends of the members 32 are rigidly connected together by a pair of longitudinal members 34, which members are parallel to the members 30. The aligned ends of members 34 are connected together by means of a pair of shafts 36 which are transverse to the members 34.

A single acting cylinder 38 having a piston therein is mounted on the bracket 26 and extends in downward direction therefrom. A piston rod 40 extends from the lower end of the cylinder 38. The lower end of the piston rod 40 has a plate 42 fixedly secured thereto. A pair of springs 44 are secured at one end to the plate 42 and at their other end to the bracket 26. A hydraulic line 46 leads from a suitable source on the tractor to the upper end of the cylinder 38. Thus, when hydraulic fluid is supplied to the top of the cylinder 38, the piston therein will be moved downwardly, thereby moving the plate 42 downwardly against the action of the springs 44. When the pressure is relieved from the upper end of the cylinder 38, the springs 44 will urge the plate and the piston upwardly.

A plurality of tines 48 having downwardly extending arcuate hay gripping ends 50 are pivotally mounted on the shafts at the lower end of the frame. The piston rod 40 is provided with a collar 52 fixedly secured thereto adjacent the plate 42. Links 54 connect the inner ends of the tines with the collar 52. Thus, movement of the piston rod downwardly will cause the collar 52 to move in the same direction, thereby forcing the arcuate ends of the tines outwardly, and upward movement of the collar 52 will cause the arcuate ends of the tines to move inwardly.

In operation, the boom is moved so as to place the hay fork over the stack which is to be moved, and pressure is applied to the upper end of the cylinder to move the tines to their outward positions. Then, the boom is lowered to place the tines over the stack to be moved, and the pressure is relieved from the upper end of the cylinder, thereby allowing the springs to move the collar 52 upwardly, which causes the arcuate ends of the tines to move inwardly. The boom is then moved to the position where it is desired to unload the material, and pressure is applied to the upper end of the cylinder, thereby opening the tines and allowing the material to fall out.

The plate 42 performs an additional function in that when the hay fork is lowered over a stack and the pressure in the upper end of the cylinder is relieved, the boom can be lowered further, thereby causing the pressure of the top of the stack against the plate 42 to aid in closing the tines.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A hydraulic hay fork comprising a frame adapted to be secured to the free end of a boom mounted on a tractor, said frame having an upper horizontally disposed member adapted to be secured to a boom, a pair of downwardly extending members on each side of said member and mounted adjacent opposite ends thereof, a lower horizontally disposed member secured between the lower ends of each pair of downwardly extending members, a pair of shafts fixed to and connecting the aligned ends of the lower horizontally disposed members and the downwardly extending members, a vertically disposed cylinder mounted on the upper member and extending downwardly in the frame, said cylinder having a piston therein and having a piston rod extended from the lower end thereof, a collar fixedly secured to said piston rod and spaced from the lower end of the same, a plurality of outwardly diverging tines having downwardly extending arcuate hay gripping ends pivotally mounted on the shafts at the lower end of the frame, links connecting the inner ends of the tines to said collar whereby pressure introduced to the upper end of the cylinder will cause downward movement of the collar forcing the lower arcuate ends of the tines outwardly, and a presser plate secured to the lower end of said piston below said collar and disposed between and spaced from said shafts.

2. A hydraulic hay fork comprising a frame adapted to be secured to the free end of a boom mounted on a tractor, said frame having an upper horizontally disposed member adapted to be secured to a boom, a pair of downwardly extending members on each side of said member and mounted adjacent opposite ends thereof, a lower horizontally disposed member secured between the lower ends of each pair of downwardly extending members, a pair of shafts fixed to and connecting the aligned ends of the lower horizontally disposed members and downwardly extending members, a vertically disposed cylinder mounted on the upper member and extending downwardly in the frame, said cylinder having a piston therein and having a piston rod extended from the lower end thereof, a collar fixedly secured to said piston rod and spaced from the lower end of the same, a plurality of outwardly diverging tines having downwardly extending arcuate hay gripping ends pivotally mounted on the shafts at the lower end of the frame, links connecting the inner ends of the tines to said collar whereby pressure introduced to the upper end of the cylinder will cause downward movement of the collar forcing the lower arcuate ends of the tines outwardly, wherein said cylinder and piston are single acting, a presser plate secured to the lower end of said piston rod below said collar and disposed between and spaced from said shafts, spring means connected between said plate and said upper frame member urging said piston upwardly in said cylinder whereby when the pressure in the cylinder is relieved, the collar will be urged upwardly forcing the lower arcuate ends of the tines inwardly.

References Cited in the file of this patent

UNITED STATES PATENTS

| Number | Name | Date |
|---|---|---|
| 2,591,431 | Henggeler | Apr. 1, 1952 |
| 2,676,837 | Wagner et al. | Apr. 27, 1954 |